(12) United States Patent
Clegg

(10) Patent No.: US 6,254,112 B1
(45) Date of Patent: Jul. 3, 2001

(54) PORTABLE FILE CASE HOLDER WITH REMOVABLE WHEELS AND STACKABLE COMPARTMENTS

(76) Inventor: Lee M. Clegg, 7 Esti Ct., Madison, NJ (US) 07940-2571

( * ) Notice: Subject to any disclaimer, the term of this patent is extended or adjusted under 35 U.S.C. 154(b) by 0 days.

(21) Appl. No.: 09/615,817

(22) Filed: Jul. 13, 2000

Related U.S. Application Data (62) Division of application No. 09/167,166, filed on Oct. 6, 1998, now Pat. No. 6,123,344.

(51) Int. Cl.[7] .................................................. B62B 1/12
(52) U.S. Cl. ..................... 280/47.19; 211/194; 280/47.26
(58) Field of Search ........................ 211/88.01, 194; 248/129; 280/47.18, 47.19, 47.26, 47.27, 79.2, 79.3

(56) References Cited

U.S. PATENT DOCUMENTS

| | | | |
|---|---|---|---|
| 2,623,760 | * 12/1952 | Fornelius | 280/47.26 |
| 3,908,831 | * 9/1975 | Brendgord | 211/88.01 |
| 4,026,616 | * 5/1977 | Kuehl | 312/250 |
| 4,118,048 | * 10/1978 | Spranger et al. | 280/47.35 |
| 4,124,261 | * 11/1978 | Klaus | 312/183 |
| 4,457,346 | * 7/1984 | Kelley | 211/88.01 |
| 4,790,549 | * 12/1988 | Aemand | 280/47.26 X |
| 4,846,485 | * 7/1989 | Payne | 280/47.18 |
| 4,865,346 | * 9/1989 | Carlile | 280/654 |
| 4,889,377 | * 12/1989 | Hughes | 211/88.01 X |
| 4,890,705 | * 1/1990 | Pineda | 190/18 A |
| 4,915,408 | * 4/1990 | Clemence et al. | 280/655 |
| 5,022,537 | * 6/1991 | Henriquez | 211/88.01 |
| 5,427,393 | * 6/1995 | Kriebel | 280/47.28 |
| 5,465,987 | * 11/1995 | DellaVecchia | 280/47.28 |

\* cited by examiner

Primary Examiner—Michael Mar
(74) Attorney, Agent, or Firm—Ezra Sutton (57) ABSTRACT

A portable file case holder including a frame member having a vertical wall and an attached bottom wall; the vertical wall having a front wall surface and a rear wall surface; and the bottom wall having a top wall surface and a bottom wall surface. The front wall surface includes a plurality of vertically spaced-apart front V-shaped mounting brackets thereon. The rear wall surface includes a rear mounting plate having a pair of mounting track rails thereon. A plurality of removable compartments are provided each having a rear wall; and each having compartment V-shaped mounting brackets on each of the rear walls for each of the compartments for connecting the compartments to the plurality of front V-shaped mounting brackets on the front wall surface to form a stacked arrangement of compartments. A wheel assembly is detachably connected to the rear mounting plate.

5 Claims, 8 Drawing Sheets

PORTABLE FILE CASE HOLDER WITH REMOVABLE WHEELS AND STACKABLE COMPARTMENTS

This application is a division of Ser. No. 09/167,166 filed Oct. 6, 1998, now U.S. Pat. No. 6,123,344.

FIELD OF THE INVENTION

This invention relates to a portable file case holder for the manual transporting of file folders, transcripts, books, manuscripts, notebooks and combinations thereof. More particularly, the portable file case holder includes a removable wheel assembly for the stabilization of the file case holder, and includes removable and stackable compartments for ease of handling as well as locking elements for attaching the compartments to the frame.

BACKGROUND OF THE INVENTION

Several types of portable holders, carts, and cabinets for transporting records, files, books and the like have been utilized in the past. These types of portable record holders are used commercially by law firms, businesses, government agencies, as well as by homeowners for transporting records from one location to another location, and may be used in commercial establishments or homes.

These portable record holders or carts do not permit the easy transport of records and files on walkways, sidewalks, stairs, escalators, steep inclines and the like without causing damage to the portable holder or cart. Additionally, the portable record holder is not readily transportable in a vehicle trunk, as the case holder is too large for the vehicle trunk. Further, the contents of the case holders often spill out in the process of transporting the file contents within the vehicle or on an escalator or on a stairwell, as the case holder is unwieldy or unstable. The records, files, books, etc. often spill or fall out from the case holder when transporting those records. Typically, the contents have to be transferred to another file cabinet, book shelf, or file case holder in order for the user to efficiently use the records and files being transported.

There remains a need for a portable file case holder having removable wheels for the stabilization of the file case holder when in use or for compact storage or ease of transportation when not in use. Further, the portable file case holder should have removable and stackable compartments for ease of handling the case file, books, case folders, or other contents within each of the compartments thereon.

DESCRIPTION OF THE PRIOR ART

Portable record holders, portable carts, and portable file cabinets for transporting of records having various designs, styles, configurations and materials of construction have been disclosed in the prior art. For example, U.S. Pat. No. 4,026,616 to KUEHL discloses a combination cabinet and roll out drawer cart. The cabinet includes a front opening having a roll out drawer being fitted therein. The roll out drawer may include a plurality of open shelves or carry several individual drawers which are supported within the roll out drawer. This prior art patent does not disclose the particular structure, design, configuration or function of the portable file case holder with removable wheels and stackable compartments of the present invention.

U.S. Pat. No. 4,124,261 to KLAUS discloses a data storage unit for storing computer print-out sheets. The data storage unit 10 includes at least one open-ended compartment and at least one portable binder adapted to be positioned horizontally in the compartment. The storage unit in another embodiment includes a plurality of smaller compartments being disposed in a horizontal position. This prior art patent does not disclose the particular structure, design, configuration or function of the portable file case holder with removable wheels and stackable compartments of the present invention.

U.S. Pat. No. 4,865,346 to CARLILE discloses a collapsible cart assembly for use in support of activities such as picnicking and beach-going events. The hand-propelled cart assembly includes a separable wheel frame having an upright section with upper and lower portions, respectively. The cart assembly also includes a foldable shelf member on the lower portion which supports a cooler chest and is provided with holding elements to preclude lateral shifting of the cooler chest during movement of the cart. This prior art patent does not disclose the particular structure, design, configuration or function of the portable file case holder with removable wheels and stackable compartments of the present invention.

U.S. Pat. No. 4,890,705 to PINEDA discloses a portable file cabinet with a retracting handle. The portable file cabinet includes a rectangular cabinet housing having a lid and having a pair of multifold file sections mounted on the interior surface of the lid. The interior of the file cabinet further includes a pair of storage compartments and a main record compartment with file dividers. A removable supply case is received within one of the compartments in the file cabinet. A pair of wheels and a retractable handle are mounted on the bottom surface of the file cabinet to provide ease of transportability by the user. This prior art patent does not disclose the particular structure, design, configuration or function of the portable file case holder with removable wheels and stackable compartments of the present invention.

None of these prior art patents teach or disclose the particular structure, design, configuration or function of the present invention of a portable file case holder with a removable wheel assembly for stabilization of the file case holder; removable and stackable compartments for ease of handling the contents within each of the compartments thereon; and locking elements for attaching the compartments to the frame such that the compartments do not become detached from the frame.

Accordingly, it is an object of the present invention to provide a portable file case holder for the manual transporting of file folders, transcripts, books, manuscripts, notebooks, computer printouts and the like.

Another object of the present invention is to provide a portable file case holder having a removable wheel assembly for the stabilization of the file case holder when not being transported from one location to another location.

Another object of the present invention is to provide a portable file case holder that has removable and stackable compartments for ease of handling the contents within each of the compartments therein.

Another object of the present invention is to provide a portable file case holder having locking elements for attaching the plurality of compartments to the frame assembly of the file case holder such that the compartments do not become detached from the frame assembly when the user is manually transporting the portable file case holder from one location to another location.

Another object of the present invention is to provide a portable file case holder that is long-lasting and durable being made of hard wood, plastic or light-weight metal.

A further object of the present invention is to provide a portable file case holder that can be mass produced in an automated and economical manner and is readily affordable by the consumer/user.

SUMMARY OF THE INVENTION

In accordance with the present invention there is provided a portable file case holder for the manual transporting of file folders, transcripts, books, manuscripts and notebooks. The portable file case holder includes a frame member having a vertical wall and an attached bottom wall; the vertical wall having a front wall surface and a rear wall surface; and the bottom wall having a top wall surface and a bottom wall surface. The front wall surface includes a plurality of vertically spaced-apart front V-shaped mounting brackets thereon. The rear wall surface includes a rear mounting plate having a pair of mounting track rails thereon.

There is also provided a plurality of removable compartments each having a rear wall; and each having compartment V-shaped mounting brackets on each of the rear walls for connecting the compartments to the plurality of front V-shaped mounting brackets on the front wall surface to form a stacked arrangement of compartments. A wheel assembly is detachably connected to the rear mounting plate.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED AND ALTERNATE EMBODIMENTS

Overview

The portable file case holder of the preferred embodiment 10 and the alternate embodiment 200 of the present invention are represented in detail by FIGS. 1 through 17 of the drawings. The portable file case holder 10 of the preferred embodiment of the present invention is represented in detail by FIGS. 1 through 16. Portable file case holder 10 includes a frame member 20, a plurality of stackable and removable compartment members 80A, 80B and 80C, and a detachable wheel assembly 110. The portable file case holder 200 of the alternate embodiment of the present invention is represented in detail by FIGS. 10 to 13 and 15 to 17 of the drawings. The portable file case holder 200 includes a frame member 220 with a (non-detachable) wheel assembly 310, and a plurality of stackable and removable compartments 80A, 80B and 80C, as depicted in FIG. 17 of the drawings. In all other respects, the portable file case holder 200 of the alternate embodiment is structurally the same as the portable file case holder 10 of the preferred embodiment except for the frame member 310 having a non-detachable wheel assembly 310, as shown in the alternate embodiment (and no horizontal bottom wall member 64 as in the preferred embodiment); and the file case holder 200 of the alternate embodiment functions and operates in a similar manner as the file case holder 10 of the preferred embodiment.

Additionally, the preferred and alternate embodiments of the portable file case holders 10 and 200 also serve as a dual function, wherein the frame member 20 and the detachable wheel assembly 110 of the preferred embodiment and the frame member 220 having a non-detachable wheel assembly 310 of the alternate embodiment can be stored separately from the compartments 80A, 80B and 80C which may be stacked and used as a temporary book case or as storage cabinets.

Detailed Description of the Preferred Embodiment 10

The preferred embodiment of the present invention provides for a portable file case holder 10, as represented in FIGS. 1 through 14, for the manual transporting by a user of file folders 12, books/notebooks 14, manuscripts, transcripts 16, computer sheet print-outs 18 and the like. The portable file case holder 10 includes a frame member 20 having an L-shaped configuration 22; a plurality of compartment members 80A, 80B and 80C; and a detachable wheel assembly 110.

Figure 7:
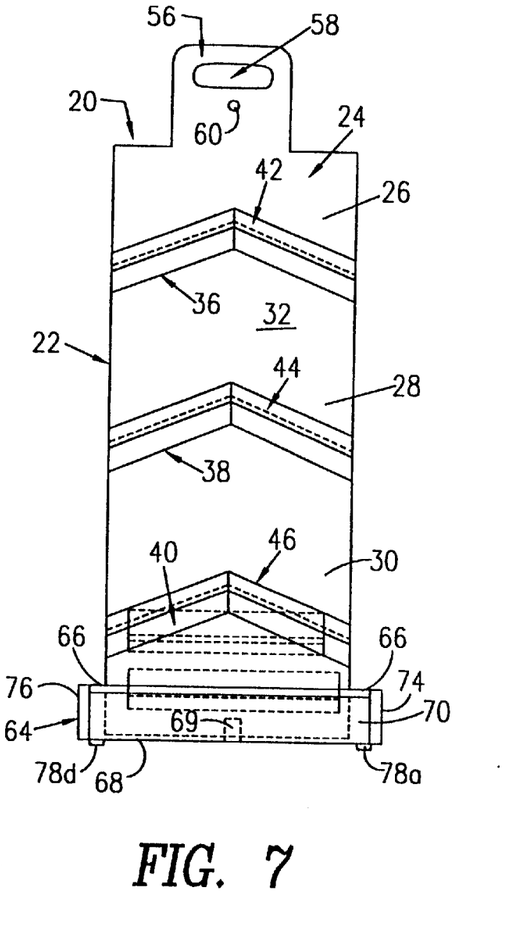
FIG. 7 is a front elevational view of the portable file case holder of the present invention showing the L-shaped frame member having a vertical wall with inverted V-shaped mounting brackets thereon, and having a bottom wall thereon.
Figure 8:
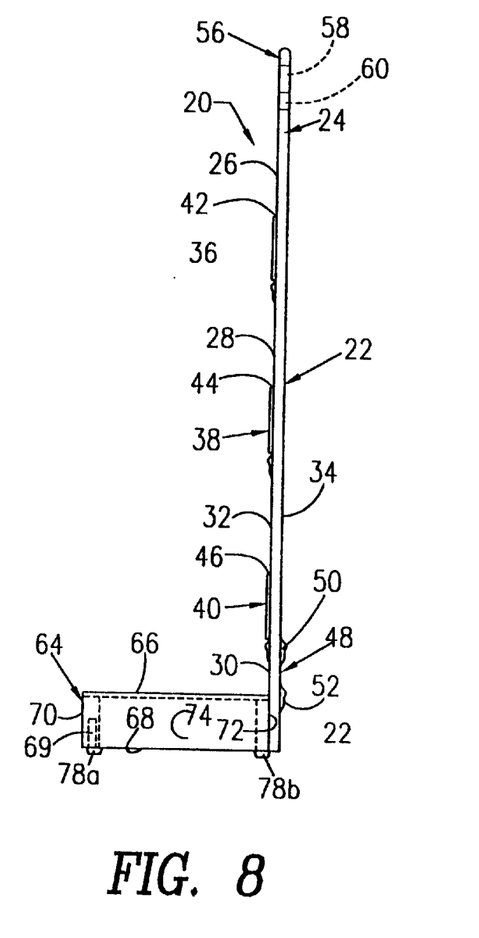
FIG. 8 is a side elevational view of the portable file case holder of the present invention showing the L-shaped frame member having a vertical wall with inverted V-shaped mounting brackets thereon and a rear mounting plate thereon, and having a bottom wall thereon.
Figure 9:
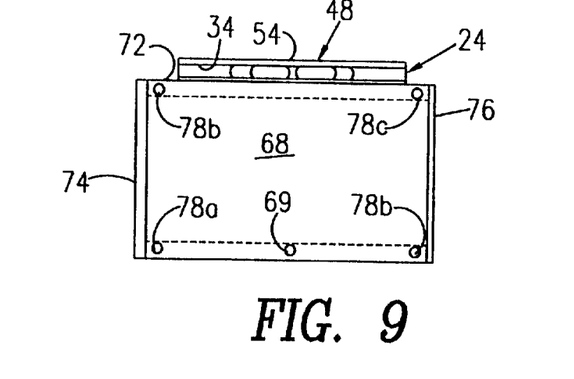
FIG. 9 is a bottom plan view of the portable file case holder of the present invention showing the rear mounting plate connected to the vertical wall of the L-shaped frame member, and the bottom wall attached to the vertical wall of the L-shaped frame member.

As shown in FIGS. 3, 7, 8 and 9 of the drawings, the frame member 20 includes a vertical wall member 24 having an upper end section 26, a center section 28 and a lower end section 30. Frame member 20 further includes a front wall surface 32 and a rear wall surface 34. Front wall surface 32 includes a first upper inverted V-shaped mounting bracket 36, a second center inverted V-shaped mounting bracket 38 and a third lower inverted V-shaped mounting bracket 40 being attached via screws to the upper end section 26, the center section 28 and the lower end section 30, respectively, of the front wall surface 32, as depicted in FIG. 7 of the drawings. Mounting brackets 36, 38 and 40 each have an upper receiving lip 42, 44 and 46, respectively, for each receiving thereof a lower bottom receiving lip 108 of mounting bracket 106 of compartments 80A, 80B and 80C, respectively, thereto.

Figure 13:
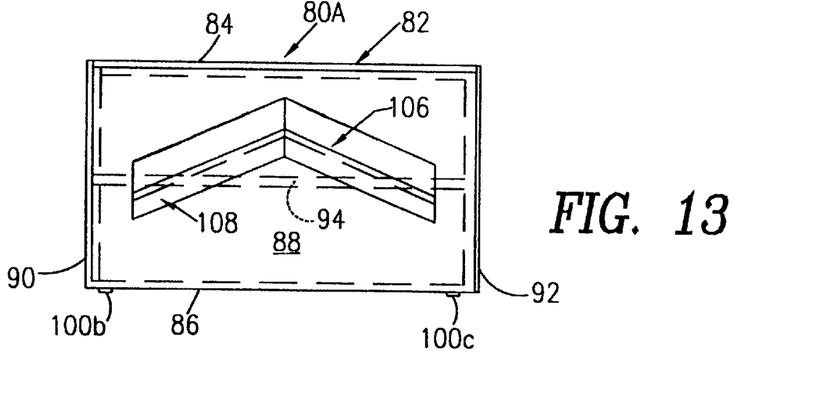
FIG. 13 is a rear elevational view of the compartment member of the present invention showing the inverted V-shaped receiving mounting bracket connected to the rear wall of the compartment member.
Figure 14:
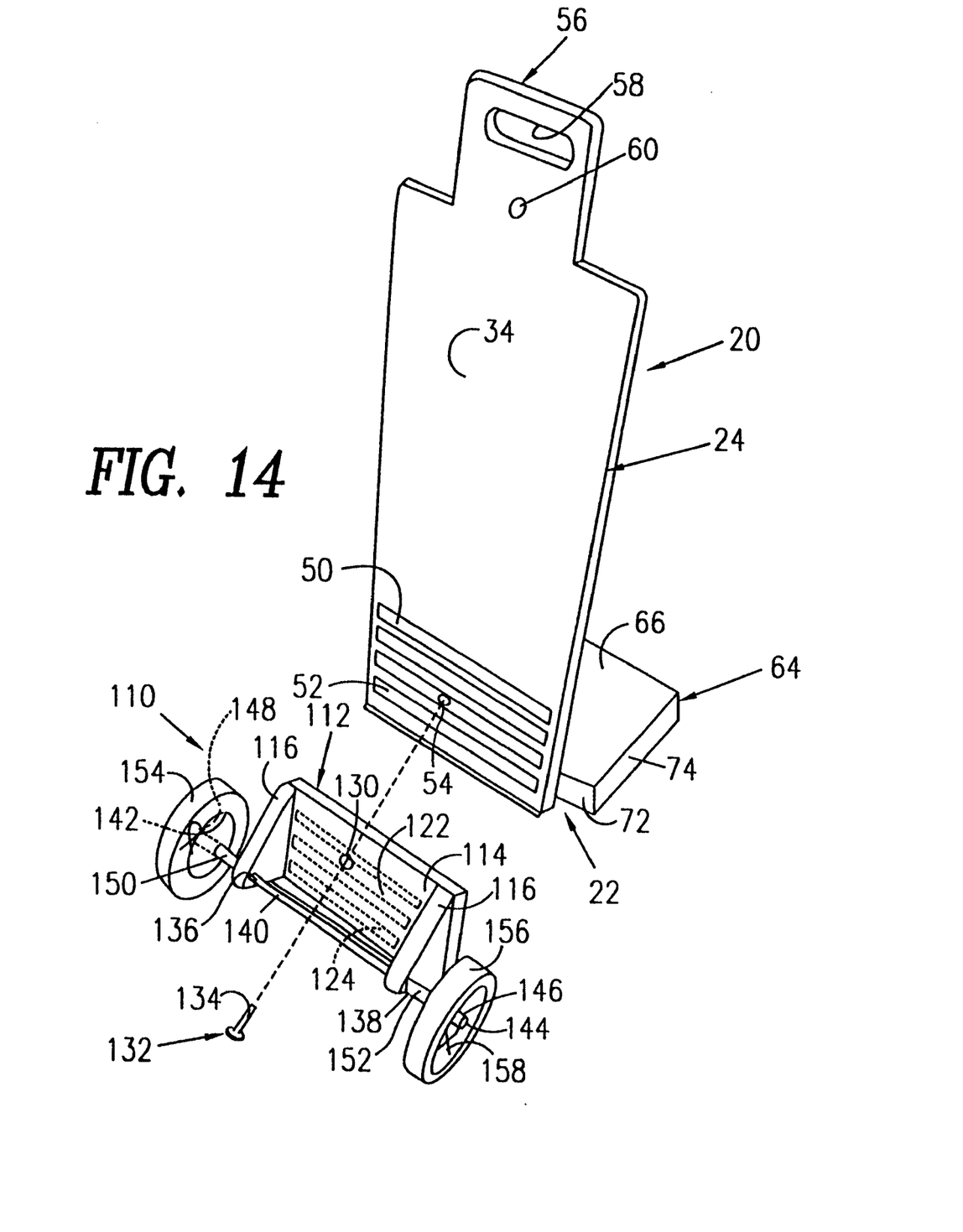
FIG. 14 is a partially exploded rear perspective view of the portable file case holder of the present invention showing the L-shaped frame member and the wheel assembly being connected together for operational use.

Rear wall surface 34, as depicted in FIGS. 13 and 14 of the drawings, includes a rear mounting plate 48 having a pair of mounting track rails 50 and 52 thereon and having a centrally-located threaded metal opening 54 therein for receiving of a mounting knob 132 therein for connecting and tightening the wheel assembly 110 thereon.

Additionally, vertical wall member 24 also includes an integrally-attached handle section 56 having a hand opening 58 therein and having a hole opening 60 for attaching one end 162 of an elasticized (bungee) cord 160 thereto.

Horizontal bottom wall member 64 includes a top wall surface 66, a bottom wall surface 68, a front wall surface 70, a rear wall surface 74, and sidewall surfaces 74 and 76. Bottom wall surface 68 includes a plurality of cushion tab members 78a to 78d mounted thereon for contacting a floor surface. Bottom wall surface 68 also includes a hole opening 69 for attaching the other end 164 of bungee cord 160 thereto.

Figure 10:
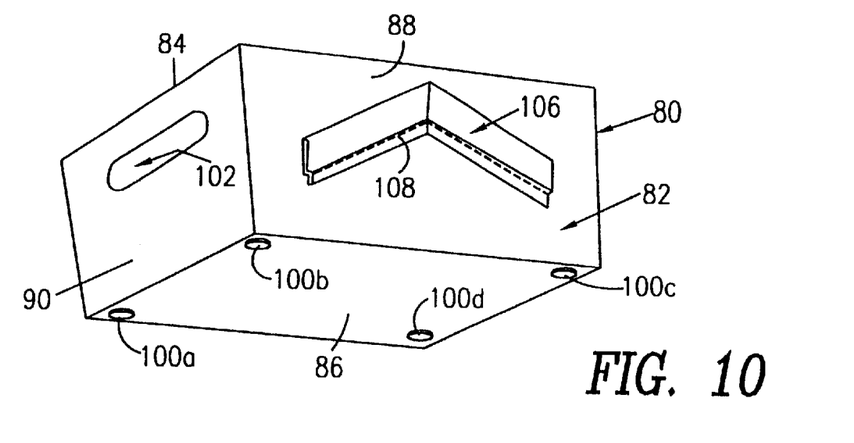
FIG. 10 is a rear perspective view of the compartment member of the present invention showing the inverted V-shaped receiving mounting bracket connected to the rear wall, the cushion tab members mounted to the bottom wall surface, and a hand opening within the side wall of the compartment member.
Figure 11:
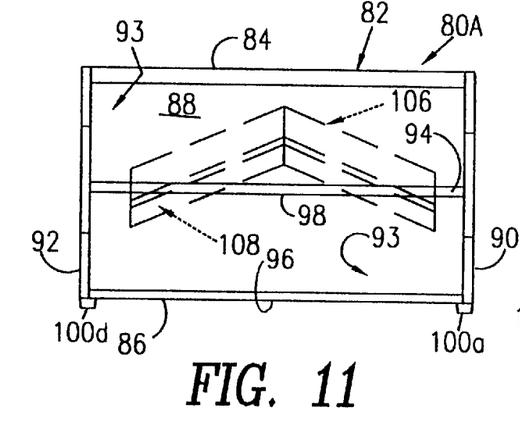
FIG. 11 is a front elevational view of the compartment member of the present invention showing the component parts thereon.
Figure 12:
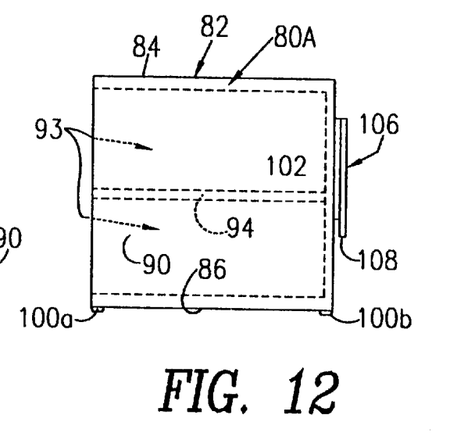
FIG. 12 is a side elevational view of the compartment member of the present invention showing the handle opening therein and the inverted V-shaped receiving mounting bracket thereon.

Each compartment member 80A, 80B, and 80C includes a rectangular-shaped housing 82 having a top wall 84, a bottom wall 86, a rear wall 88, and sidewalls 90 and 92 for forming an interior chamber area 93 with an interior center shelf 94 therein. Bottom wall 86 includes a semi-oval cut-out section 96, and center shelf 94 includes a semi-oval cut-out section 98 for ease of manually removing the contents from the interior area 93 by the user. Bottom wall 86 also includes a plurality of cushion tab members 100a to 100d mounted thereon for contact and cushioning of a contact surface. Sidewalls 90 and 92 each include a hand opening 102 and 104, respectively for easily removing the compartments 80A, 80B, and 80C from the frame member 20 by the user. Rear wall 88 includes an inverted V-shaped receiving mounting bracket 106 being centrally positioned thereon and having a lower bottom receiving lip 108 for engaging and mating with the upper receiving lips 42, 44, and 46 of mounting brackets 36, 38, and 40 on front wall surface 32, respectively, of the frame member 20, as depicted in FIGS. 3 and 10 of the drawings.

The detachable wheel assembly 110 includes a U-shaped wheel mounting bracket member 112 having a rear mounting wall 114 and attached sidewalls 116 and 118 thereon. Rear mounting wall 114 includes a wheel assembly mounting plate 120 having a pair of channel inserts 122 and 124 for engaging and mating with the pair of mounting track rails 50 and 52 of the rear mounting plate 48, respectively, on the rear wall surface 34 of frame member 20. Wheel assembly mounting plate 120 also includes a threaded opening 126 for receiving therein a mounting knob 132. Rear mounting wall 114 further includes a centrally located hole opening 130 in alignment with threaded opening 126 for receiving of the threaded stem 134 of mounting knob 132 therethrough. The threaded stem 134 of mounting knob 132 is threaded through the threaded opening 126 such that the wheel assembly 110 is fastened and cannot move or shift from the frame member 20 when the file case holder is in motion.

Figure 1:
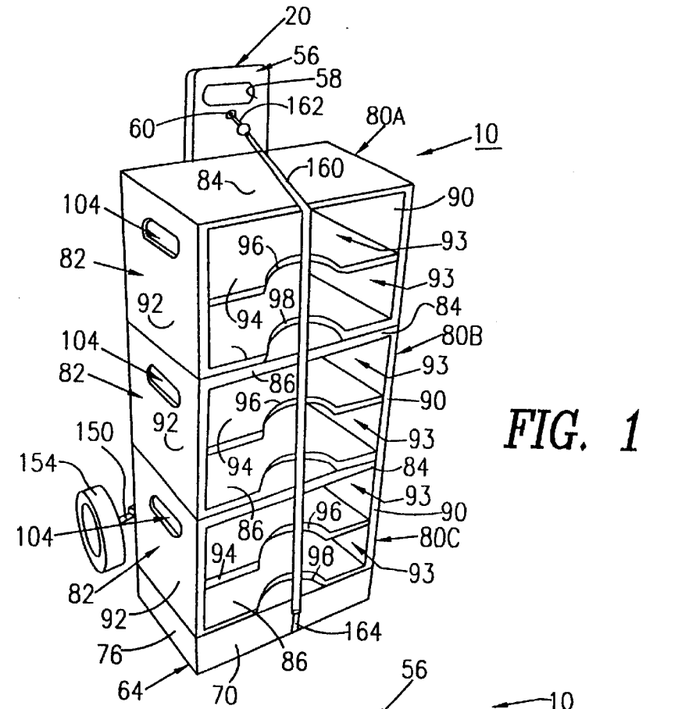
FIG. 1 is a front perspective view of the portable file case holder of the preferred embodiment of the present invention showing it in the assembled state and in an operational mode for use by the user.
Figure 2:
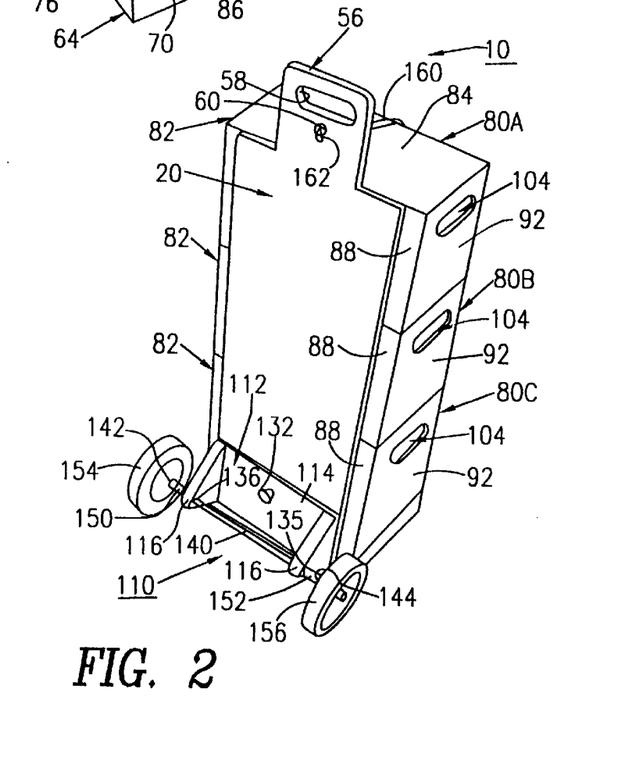
FIG. 2 is a rear perspective view of the portable file case holder of the present invention showing it in the assembled state and in an operational mode for use by the user.
Figure 3:
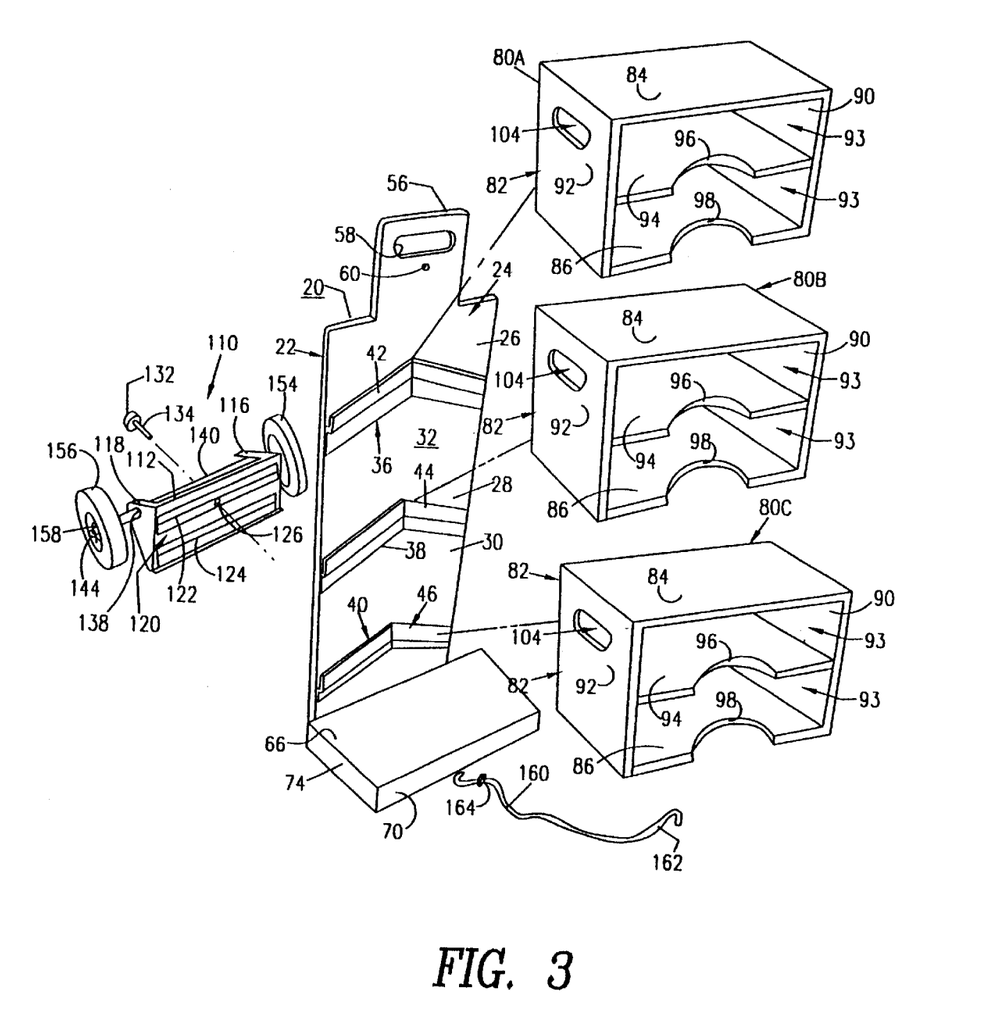
FIG. 3 is an exploded front perspective view of the portable file case holder of the present invention showing the L-shaped frame member, the plurality of compartment members, and the removable wheel assembly.

Sidewalls 116 and 118 each include an axle opening 136 and 138, respectively, for receipt therein of a wheel axle member 140, as shown in FIGS. 3 and 14 of the drawings. Wheel axle member 140 at each end 142 and 144 include a carter pin opening 146 and 148, respectively, for carter pins 158 for attaching and retaining wheels 154 and 156 thereon. The wheel assembly 110 further includes a pair of axle collar spacers 150 and 152 for the spacing apart of wheels 154 and 156 from sidewalls 116 and 118, respectively, of the U-shaped bracket member 112. Wheels 154 and 156 can be made of plastic or rubber.

The L-shaped frame member 20, the rectangular compartments 80A, 80B and 80C and the U-shaped wheel mounting bracket member 112 can be constructed from hard wood materials, durable plastics or light-weight metals. Hard wood materials are selected from the group consisting of oak, maple, cherry, walnut, black walnut, aspen, spruce, and combinations thereof. Durable plastic materials are selected from the group consisting of nylons, polyethylenes, polypropylenes, polyurethanes, polyamides, Teflons™, and equivalents thereof. Light-weight metals are selected from the group consisting of aluminum and stainless steel. The vertical wall member 24 of frame member 20 has a height measurement in the range of thirty-seven inches (37"±½") to forty-two inches (42"±½"), a width measurement of thirteen inches (13"±½") and a wall thickness measurement in the range of one-eighth to three-quarters of an inch (⅛" to ¾") depending upon the type of construction material being used in the fabrication of the component parts for the manufacture of file case holder 10. The bottom wall member 64 of frame member 20 has a length measurement of ten and one-half inches (10½"±½"), a width measurement of seventeen inches (17"±½"), and a wall thickness measurement in the range of one-eighth of an inch to three inches (1/8" to 3") depending upon the type of construction material being used in the fabrication of the component parts for the manufacture of file case holder 10. Each of the removable compartments 80A, 80B and 80C has a height measurement of ten and one-half inches (10½"±½"), a width measurement of seventeen inches (17"±½"), a depth measurement of ten and one-half inches (10½"±½"), and a wall thickness in the range of one-eighth of an inch to three-quarters of an inch (1/8" to 3/4") depending upon the type of construction material being used in the fabrication of the compartment members 80A, 80B or 80C for use with frame member 20. It is understood that the construction materials of plastics or metals used in making of the component parts for the file case holder 10 can have a veneer or finish in the appearance of a wood product.

Detailed description of the Alternate Embodiment 200

Figures 15, 15A:
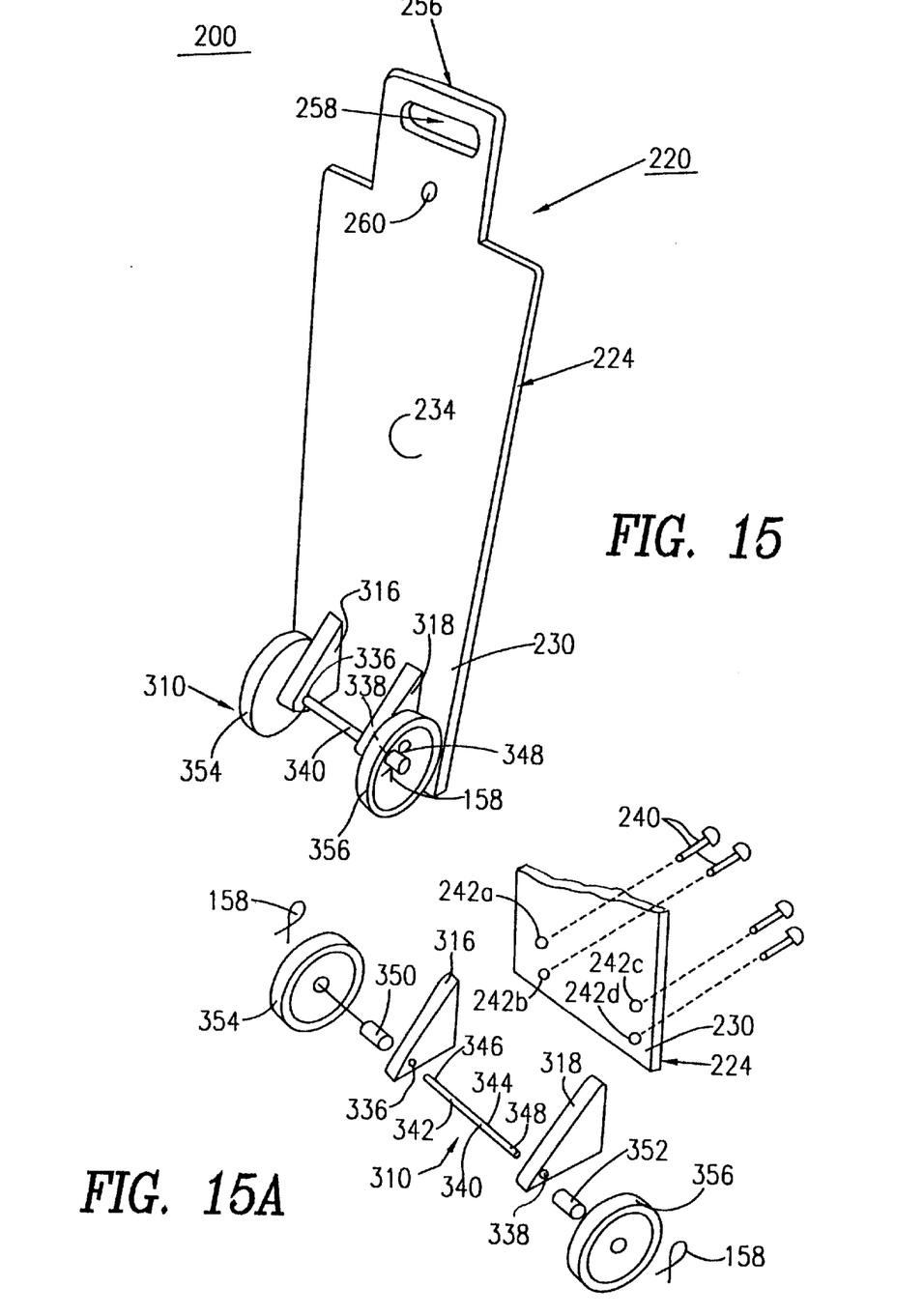
FIG. 15 is a rear perspective view of the portable file case holder of the preferred embodiment of the present invention showing the frame member and the wheel assembly in an assembled state.
FIG. 15A is a partially exploded rear perspective view of the portable file case holder of the preferred embodiment of the present invention showing the frame member and the wheel assembly being permanently attached together via screws for operational use.
Figures 16, 17:
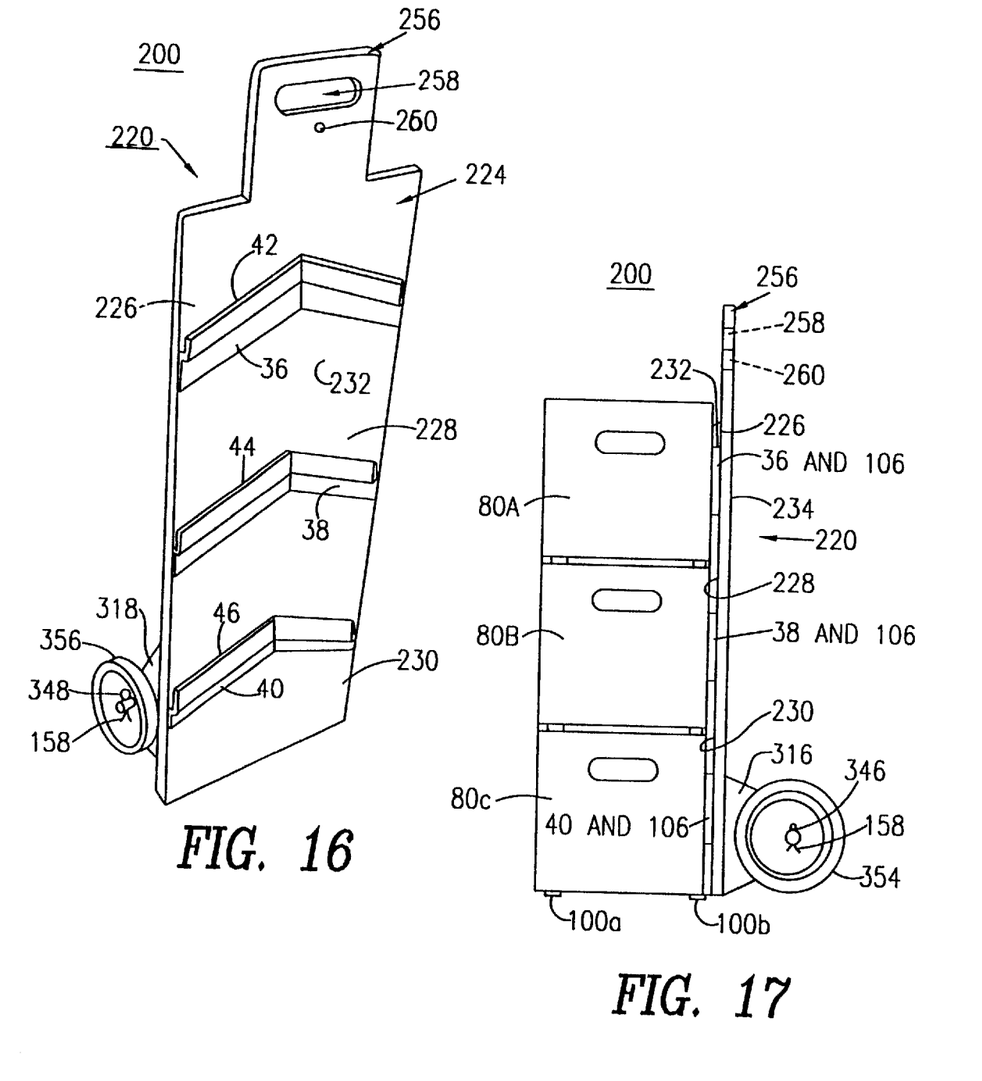
FIG. 16 is a front perspective view of the portable file case holder of the preferred embodiment of the present invention showing the frame member having a vertical wall with inverted V-shaped mounting brackets mounted thereon.
FIG. 17 is a side elevational view of the portable file case holder of the preferred embodiment of the present invention showing the frame member with the non-detachable wheel assembly mounted thereon with the plurality of compartment members attached thereto, in an assembled state, and in an operational mode for use by the user.

The alternate embodiment of the present invention provides for a portable file case holder 200, as represented in FIGS. 10 to 13 and 15 to 17 of the drawings, for the manual transporting by a user of file folders, books, notebooks, manuscripts, transcripts, computer sheet print-outs and the like. The portable file case holder 200 includes a frame member 220 having a non-detachable wheel assembly 310 and a plurality of stackable and removable compartments 80A, 80B and 80C, as depicted in FIG. 17. Frame member 220, as shown in FIGS. 15 and 16, includes a vertical wall member 224 having an upper end section 226, a center section 228 and a lower end section 230. Frame member 220 further includes a front wall surface 232 and a rear wall surface 234. Front wall surface 232 includes a first upper inverted V-shaped mounting bracket 36, a second center inverted V-shaped mounting bracket 238 and a third lower inverted V-shaped mounting bracket 40 being attached via screws to the upper end section 226, the center section 228 and the lower end section 230, respectively, of the front wall surface 232, as depicted in FIG. 16 of the drawings. Mounting brackets 36, 38 and 40 each have an upper receiving lip 42, 44 and 46, respectively, for each receiving thereof a lower bottom receiving lip 108 of mounting bracket 106 of compartments 80A, 80B and 80C, respectively, thereto. Rear wall surface 234, as depicted in FIG. 15 includes a non-detachable wheel assembly 310 thereon being located at the lower end section 230 of vertical wall member 224. Wheel assembly 310 includes a pair of sidewalls 316 and 318 attached to the rear wall surface 234 via screws 240 through hole openings 242a to 242d on vertical wall 224.

Sidewalls 316 and 318 each include an axle opening 336 and 338, respectively, for receipt therein of a wheel axle member 340, as shown in FIG. 15 of the drawings. Wheel axle member 340 at each end 342 and 344 include a carter pin opening 346 and 348, respectively, for carter pins 158 for attaching and retaining wheels 354 and 356 thereon. The wheel assembly 310 further includes a pair of axle collar spacers 350 and 352 for the spacing apart of wheels 354 and 356 from sidewalls 316 and 318, respectively, of the wheel assembly 310. Wheels 354 and 356 can be made of plastic or rubber.

Additionally, vertical wall member 224 also includes an integrally-attached handle section 256 having a hand opening 258 therein and having a hole opening 260 for attaching one end 162 of an elasticized (bungee) cord 160 thereto.

The frame member 220, the rectangular compartments 80A, 80B and 80C and the sidewalls 316 and 318 can be constructed from hard wood materials, durable plastics or light-weight metals. Hard wood materials are selected from the group consisting of oak, maple, cherry, walnut, black walnut, aspen, spruce, and combinations thereof. Durable plastic materials are selected from the group consisting of nylons, polyethylenes, polyproplylenes, polyurethanes, polyamides, Teflons™, and equivalents thereof. Light-weight metals are selected from the group consisting of aluminum and stainless steel.

The vertical wall member 224 of frame member 220 has a height measurement in the range of thirty-seven inches (37"±½") to forty-two inches (42"±½"), a width measurement of thirteen inches (13"±½") and a wall thickness measurement in the range of one-eighth to three-quarters of an inch (1/8" to 3/4") depending upon the type of construction material being used in the fabrication of the component parts for the manufacture of file case holder 200. Each of the removable compartments 80A, 80B and 80C has a height measurement of ten and one-half inches (10½"±½"), a width measurement of seventeen inches (17"±½"), a depth measurement of ten and one-half inches (10½"±½"), and a wall thickness in the range of one-eighth of an inch to three-quarters of an inch (1/8" to 3/4") depending upon the type of construction material being used in the fabrication of the compartment members 80A, 80B or 80C for use with frame member 320. It is understood that the construction materials of plastics or metals used in making of the component parts for the file case holder 200 can have a veneer or finish in the appearance of a wood product. In all other respects, the portable file case holder 200 functions and operates in a similar manner as portable file case holder 10 of the present invention.

Operation of the Invention

In operation, starting from an unassembled state, as shown in FIG. 3 of the drawings, the portable file case holder 10 is assembled in the following steps. The first step is the loading of each of the compartments 80A, 80B and 80C with items such as file case folders 12, transcripts, notebooks, books 14, manuscripts 16, computer sheet printouts 18 and the like, as depicted in FIG. 4 of the drawings.

The next step is loading each of the compartments 80A, 80B and 80C to the frame member 20. The user now places the bottom wall 86 of compartment 80C onto the top wall surface 64 of the horizontal bottom wall member 64 by simultaneously matching and engaging the upper receiving lip 46 of the lower inverted V-shaped mounting bracket 40 with the lower bottom receiving lip 108 of the inverted V-shaped receiving mounting bracket 106 (on the rear wall 88 of compartment 80C) in order to lock in place compartment 80C on frame member 20. This step is repeated for compartment 80B and 80A wherein the upper receiving lip 44 of the middle inverted V-shaped mounting bracket 38 is matched and engaged with the lower bottom receiving lip 108 of the inverted V-shaped receiving mounting bracket 106 of compartment 80B and the upper receiving lip 42 of the upper inverted V-shaped mounting bracket 36 is matched and engaged with the lower bottom receiving lip 108 of the inverted V-shaped receiving mounting bracket 106 of compartment 80A in order to lock in place both compartments 80B and 80A, respectively.

As compartments 80A, 80B and 80C are now locked in place on frame member 20, the user now attaches the wheel assembly 110 to frame member 20, as depicted in FIG. 14 of the drawings. In attaching the wheel assembly 110 to rear wall surface 34 of vertical wall 24, the user slides and engages the channel inserts 122 and 124 of the wheel assembly mounting plate 120 with that of mounting track rails 50 and 52 of the rear mounting plate 48, respectively. The user now engages the threaded stem 134 of mounting knob 132 within the aligned threaded openings 126 and 54, respectively, in order to lock in place the wheel assembly mounting plate 120 to the rear mounting plate 48, a depicted in FIGS. 2, 5, 6 and 14 of the drawing.

Figures 4, 5, 6:
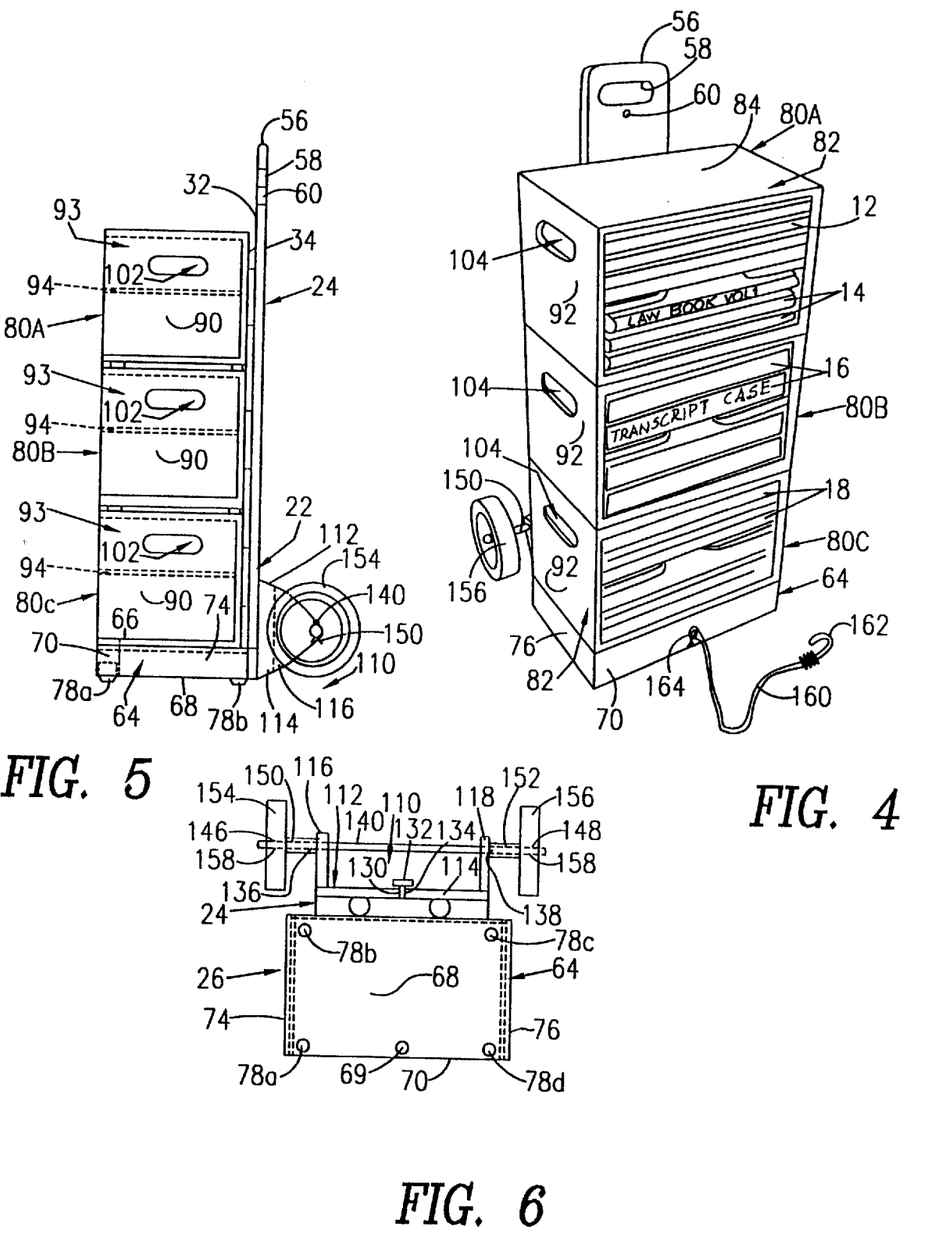
FIG. 4 is a front perspective view of the portable file case holder in operational use with the plurality of compartment members carrying a load of case folders, books and manuscripts therein.
FIG. 5 is a side elevational view of the portable file case holder of the present invention showing the L-shaped frame member, the plurality of compartment members, and the removable wheel assembly.
FIG. 6 is a bottom plan view of the portable file case holder of the present invention showing the L-shaped frame member and wheel assembly attached thereon.

The final assembling step is attaching the elasticized (bungee) cord 160 to the frame member 20, as shown in FIGS. 3 and 4 of the drawings. The user now attaches the first end 162 of bungee cord 160 via hook connector 162h to hole opening 60 of handle section 56 and attaches the second end 164 of bungee cord 160 via hook connector 164h to hole opening 69 on bottom wall surface 68 of the bottom wall member 64 in order to prevent the contents within the interior chamber area 93 of compartments 80A, 80B and 80C from falling out when the file case holder is being transported by the user.

The user is now ready to transfer the portable file case holder 10 from one location to another location by simply tilting the file case holder 10 to a 45° to 60° angle in order to angle upward the bottom wall member 64 of frame member 20 in order for wheels 154 and 156 to move freely on stairs, floors, escalators, walkways and the like.

To unload and unassemble the file case holder 10, the user simply reverses the aforementioned steps for disassembling the detachable wheel assembly 110 and for removing the stackable compartments 80A, 80B and 80C from frame member 20, as shown in FIGS. 3 and 14 of the drawings.

Advantages of the Present Invention

Accordingly, an advantage of the present invention is that it provides for a portable file case holder for the manual transporting of file folders, transcripts, books, manuscripts, notebooks, computer printouts and the like.

Another advantage of the present invention is that it provides for a portable file case holder having a removable wheel assembly for the stabilization of the file case holder when not being transported from one location to another location.

Another advantage of the present invention is that it provides for a portable file case holder that has removable and stackable compartments for ease of handling the contents within each of the compartments therein.

Another advantage of the present invention is that it provides for a portable file case holder having locking elements for attaching the plurality of compartments to the frame assembly of the file case holder such that the compartments do not become detached from the frame assembly when the user is manually transporting the portable file case holder from one location to another location.

Another advantage of the present invention is that it provides for a portable file case holder that is long-lasting and durable being made of hard wood, plastic or lightweight metal.

A further advantage of the present invention is that it provides for a portable file case holder that can be mass produced in an automated and economical manner and is readily affordable by the consumer/user.

A latitude modification, change and substitution is intended in the foregoing disclosure, and in some instances, some features of the invention will be employed without corresponding use of other features. Accordingly it is appropriate that the appended claims be construed broadly and in a manner consistent with the spirit and scope of the invention herein.

What is claimed is:

1. A portable file case holder, comprising:

a) a frame member having a vertical wall; said vertical wall having a front wall surface and a rear wall surface;

b) said front wall surface having a plurality of vertically spaced-apart front connecting means thereon; said front connecting means including mounting brackets each having upper receiving lips thereon and being inverted V-shaped;

c) a plurality of removable compartments each having a rear wall; compartment connecting means on each of said rear walls of each of said compartments for connecting said plurality of compartments to said plurality of front connecting means on said front wall surface to form a stacked arrangement of compartments, each of said compartment connecting means includes angled means for mating with respective ones of said inverted V-shape mounting brackets; and d) a wheel assembly connected to said rear wall surface.

2. A portable file case holder in accordance with claim 1, wherein said angled means of each compartment connecting means includes an inverted V-shaped receiving mounting bracket having a lower bottom receiving lip thereon for engaging and mating with said upper receiving lips of said front inverted V-shaped mounting brackets on said front wall surface.

3. A portable file case holder in accordance with claim 1, wherein said removable compartments each include a top wall, a bottom wall, said rear wall, and sidewalls for forming an interior chamber area having an interior center shelf therein.

4. A portable file case holder in accordance with claim 3, wherein said interior chamber area is used for retaining file folders, transcripts, books, manuscripts, notebooks, computer sheet printouts or combinations thereof.

5. A portable file case holder in accordance with claim 3, wherein said bottom wall of said compartments each include a plurality of cushion tab members mounted thereon for contact and cushioning to a contact surface.

* * * * *